United States Patent [19]

Stratton et al.

[11] Patent Number: 4,893,287
[45] Date of Patent: Jan. 9, 1990

[54] VELOCITY REFERENCE SYSTEM

[75] Inventors: Kenneth L. Stratton, Chillicothe; Ali A. Bitar, Peoria, both of Ill.

[73] Assignee: Caterpillar Inc., Peoria, Ill.

[21] Appl. No.: 134,418

[22] Filed: Dec. 17, 1987

[51] Int. Cl.$^4$ .............................................. G01S 9/66
[52] U.S. Cl. ...................................... 367/91; 342/116
[58] Field of Search ........................... 367/89, 90, 91; 342/104, 107, 116, 113, 117; 356/27, 28

[56] References Cited

U.S. PATENT DOCUMENTS

| | | | |
|---|---|---|---|
| 3,066,279 | 11/1962 | Marks | 367/89 |
| 3,277,430 | 10/1966 | Hagemann et al. | 367/96 |
| 3,893,076 | 7/1975 | Clifford | 367/91 |
| 4,065,745 | 12/1977 | Robinson | 367/89 |
| 4,168,906 | 9/1979 | Schwiesow | 356/28 |
| 4,470,696 | 9/1984 | Ballard | 356/28 |
| 4,506,353 | 3/1985 | Rott et al. | 367/91 |
| 4,608,568 | 8/1986 | Egawa | 367/90 |
| 4,728,954 | 3/1988 | Phelan et al. | 367/91 |
| 4,735,088 | 4/1988 | Pinyan et al. | 367/902 |

FOREIGN PATENT DOCUMENTS 0139772 10/1979 Japan .................................. 367/91

Primary Examiner—Thomas H. Tarcza
Assistant Examiner—Tod Swann
Attorney, Agent, or Firm—Stephen L. Noe

[57] ABSTRACT

A velocity reference system uses a Doppler shift between transmitted and received wave energy to determine the relative speed between the system and a surface or element. Other systems employing Doppler shifts for detecting velocity suffer from poor measurement accuracy. Cross talk between channels of systems having multiple transmitters and receivers produces measurement errors. Additionally, errant movement generates measurement errors since the sensors cannot distinguish such errant movement from forward velocity. Two sensing units directed towards one another, and preferably towards the same location on the surface, effectively eliminates random vehicle movement. Furthermore, transmitting different frequencies from the two sensing units reduces cross talk between the two channels. Vehicle applications require a system capable of minimizing errant movement and environmental noise.

24 Claims, 5 Drawing Sheets

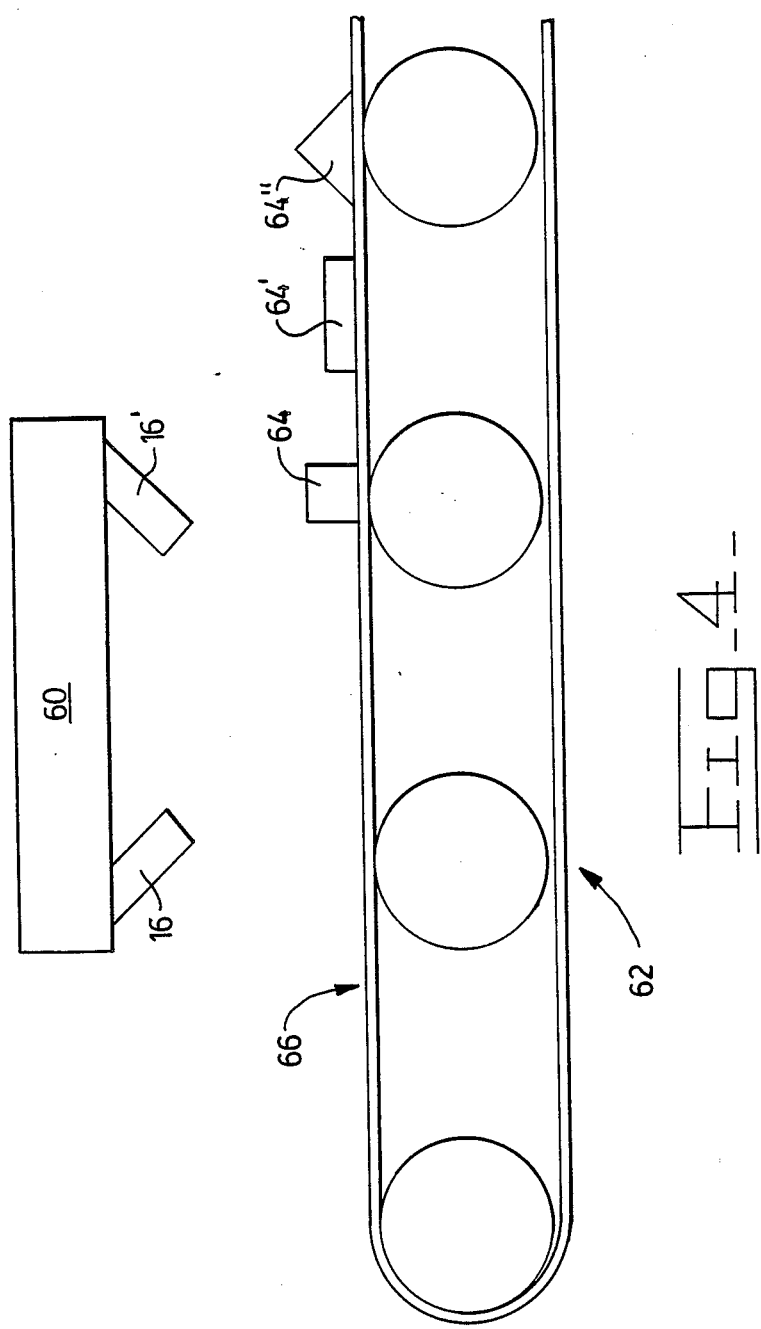

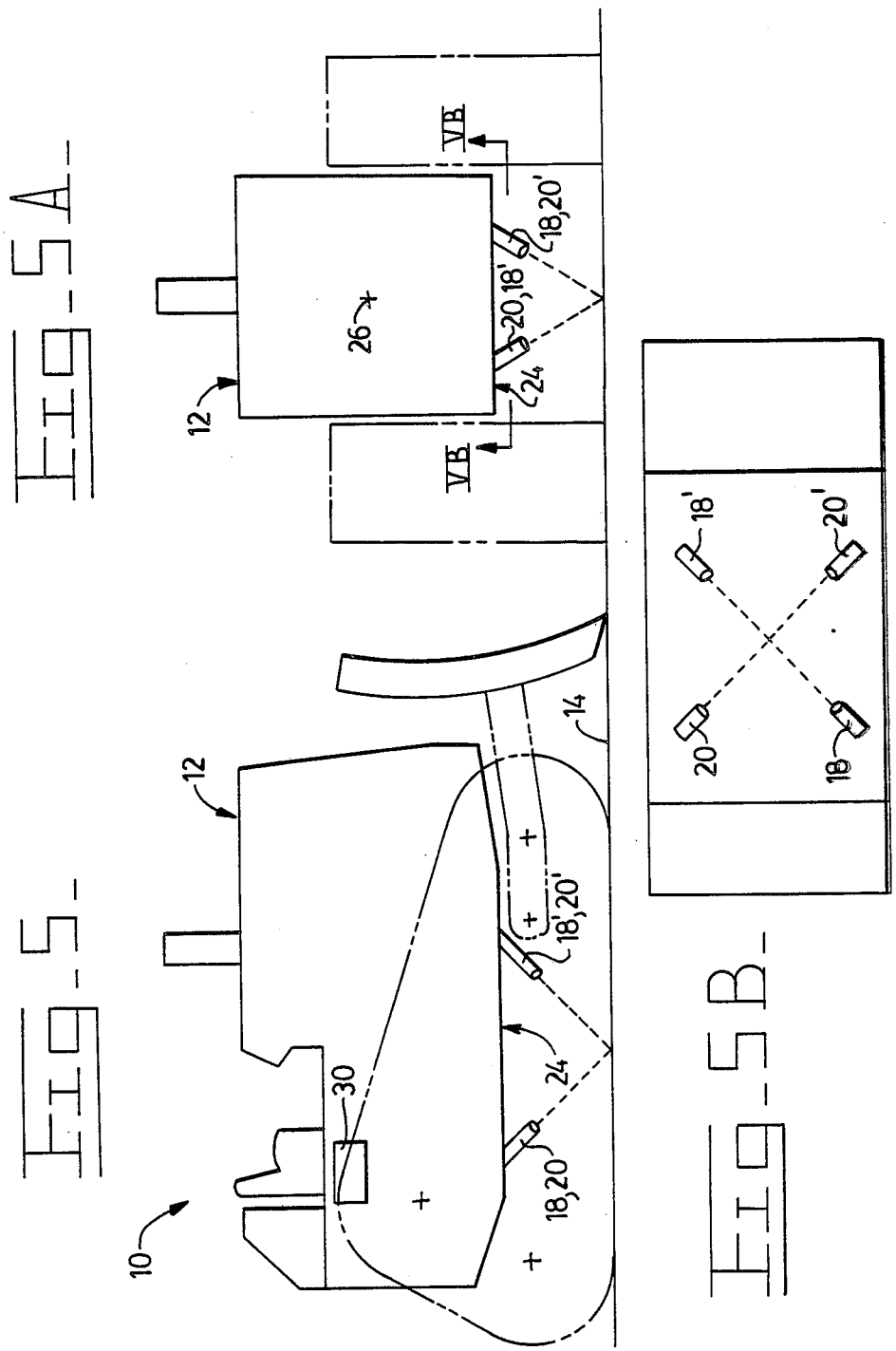

VELOCITY REFERENCE SYSTEM

TECHNICAL FIELD

The invention relates generally to velocity sensors and more particularly to ultrasonic velocity sensors using Doppler shifts to detect velocity.

BACKGROUND ART

Methods utilizing the Doppler phenomenon for measuring the velocity of one body with respect to another are known in the art. Many methods are directed towards vehicle applications. In such applications, an apparatus is typically mounted at the rear or on the underside of a vehicle so as to transmit wave energy to an underlying surface. The apparatus receives wave energy reflected from the surface and calculates the Doppler shift to determine the speed or distance travelled by the vehicle with respect to the surface.

In theory this method for determining velocity works quite well. In practice, however, prior art methods prove adequate at best, and unsatisfactory in harsh or rapidly changing environments. Transmitter and receiver placement shown in the prior art promotes inherent problems in a velocity measuring system of this type. Some apparatus use a single transmitter/receiver mounted on the rear of a vehicle. Changes of the slope of the surface over which the vehicle travels introduce Doppler shifts which render false velocity information. The "pitching" of land vehicles as they travel over uneven terrain causes the sensor to move relative to the surface, thus inducing Doppler shifts which are not wholly indicative of vehicle speed but vehicle pitch as well. Similar devices used on ships deliver inaccurate information due to irregularities on the sea floor.

Other transmitter/receiver placements attempt to overcome inaccuracies found in these single-sensor devices. U.S. Pat. No. 4,506,353 issued to Rott et al on Mar. 19, 1985; U.S. Pat. No. 3,745,520 issued to Barret et al on July 10, 1973; and U.S. Pat. No. 3,893,076 issued to Clifford on July 1, 1975 disclose vehicles having two transmitter/receivers being centrally located on the underside of a vehicle, and positioned to transmit away from one another, one forwardly and one rearwardly. The Doppler shifts of each are compared one with another in order to eliminate a portion of the inaccuracies encountered due to a changing ground profile. These arrangements effectively eliminate the majority of vertical irregularities, such as vehicle bounce. However, since one transmitter/receiver is aimed away from the other, variations occur in this distance which effect the accuracy of the measurements. For instance, should the vehicle crest a hill, both transmitter/receivers will sense an increase in speed, while in fact a portion of the sensed speed is related to the pitching of the vehicle.

Additionally, cross talk between one transmitter/receiver and another causes apparent speed variations. Typically, both transmitters emit the same frequency. When the reflected waves impinge on the receivers, the receivers cannot distinguish between the signals sent from their transmitter and the other transmitter. This situation usually causes inaccuracies in calculated speed, or signal loss due to destructive interference. Moreover, the demodulation schemes used by a variety of known Doppler speed detectors are largely analog. Phase locked loops attempt to lock on to the incoming reflected signal and accurately determine its frequency. However, multiple out-of-phase reflections are difficult to lock on, and commonly produce errors in detected frequency. If the frequency of the received signal cannot be accurately determined under severe conditions, such as vehicle applications, the device cannot render an accurate indication of velocity.

Other environmental conditions besides a changing surface and vehicle pitch impose errors on many known detectors. Wind velocity, vehicle noise and vibration, and ambient temperature introduce inaccuracies into the detection schemes. Wind causes amplitude changes which are usually detected as signal shift, thus "fooling" analog detection schemes. Some sensors exhibit sensitivity to vehicle vibration, which corrupts the received signal and results in signal loss or poor velocity measurements. Changes in ambient temperature affect wave velocity and Doppler shift. Errors easily reaching 20% or more are encountered in some environments.

The present invention is directed to overcoming one or more of the problems as set forth above.

BRIEF DESCRIPTION OF THE DRAWINGS

FIG. 4 illustrates a preferred embodiment of the present invention in an alternative application; and FIG. 5 illustrates another preferred embodiment of the present invention in a vehicle application.

BEST MODE FOR CARRYING OUT THE INVENTION

Figure 1:
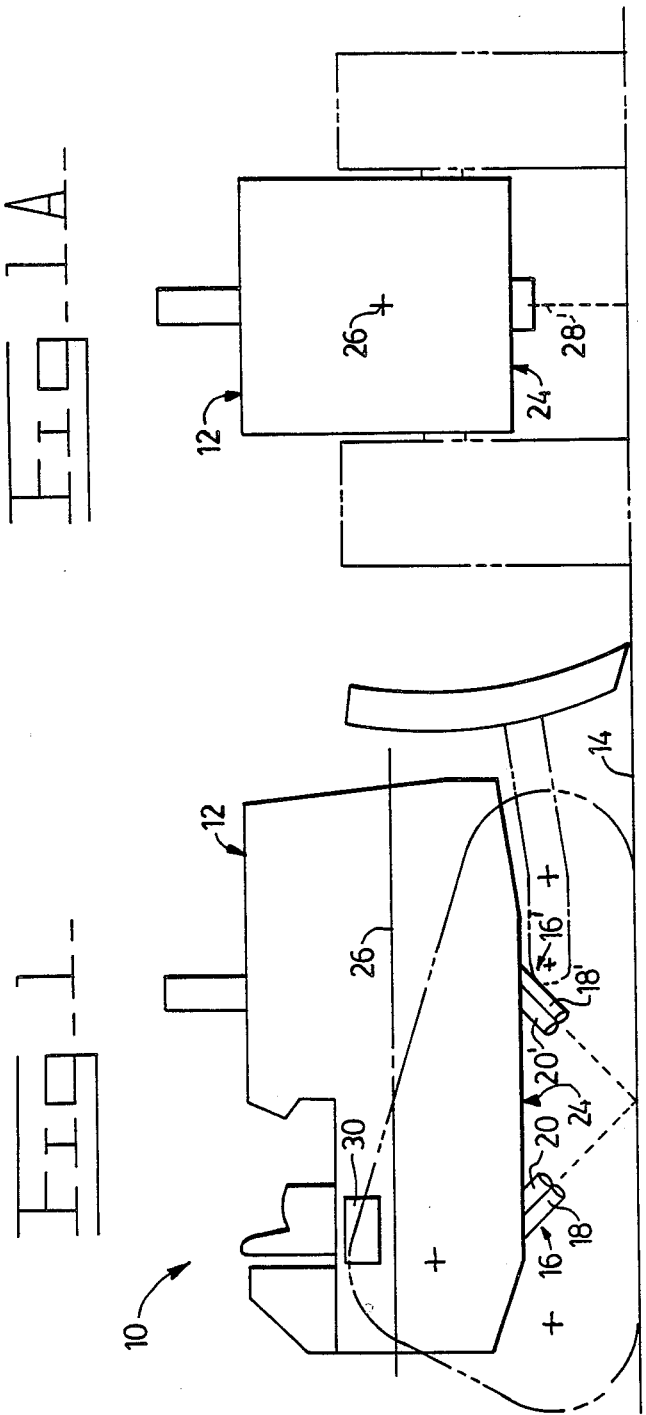
FIG. 1 illustrates a preferred embodiment of the present invention in a vehicle application.

Referring now to the drawings, a preferred embodiment of the velocity reference system 10 is shown. FIG. 1 illustrates a vehicle 12, for example a track-type tractor, having a velocity reference system 10 fitted thereon. The velocity reference system 10 determines the relative velocity between itself and another element, such as a surface 14. The velocity reference system 10 uses a first sensing unit 16 and a second sensing unit 16' which are adapted to transmit and receive wave energy. Each sensing unit 16,16' has a transmitter 18,18' and a receiver 20,20', respectively. The sensing units 16,16' are connected to a support 24. The underside of the vehicle 12 functions as the support 24 for the sensing units 16,16' in this embodiment. The sensing units 16,16' are positioned in spaced relation along a common axis 26. In the case of a vehicle application, as shown with respect to FIG. 1, the common axis 26 is the longitudinal axis of the vehicle, which extends in the direction of vehicle travel.

The sensing units 16,16' transmit wave energy in a direction generally towards one another and at an angle of less than 90 degrees from the common axis 26 in a plane 28 containing the common axis 26. As shown here, the plane 28 extends vertically from the common axis 26 to the surface 14. The surface 14 reflects a portion of the transmitted wave energy. At least one of the sensing units 16,16' receives the reflected wave energy. A processing means 30 determines the relative velocity between the sensing units 16,16' and the surface 14 in response to a Doppler shift of the received reflected wave energy.

The theory by which Doppler shift measurements indicate relative speed is old in the art. Basically, as waves are transmitted from a moving object, the frequency of the waves propagating in the direction of motion is greater than the frequency of the waves in the opposite direction. Likewise, as waves are transmitted from a stationary object, an observer moving towards the object experiences a higher frequency than does an observer moving away from the object. These higher and lower frequencies are measured and compared with the transmitted frequency. The comparison yields an indication of relative speed between the two objects.

Figure 2:
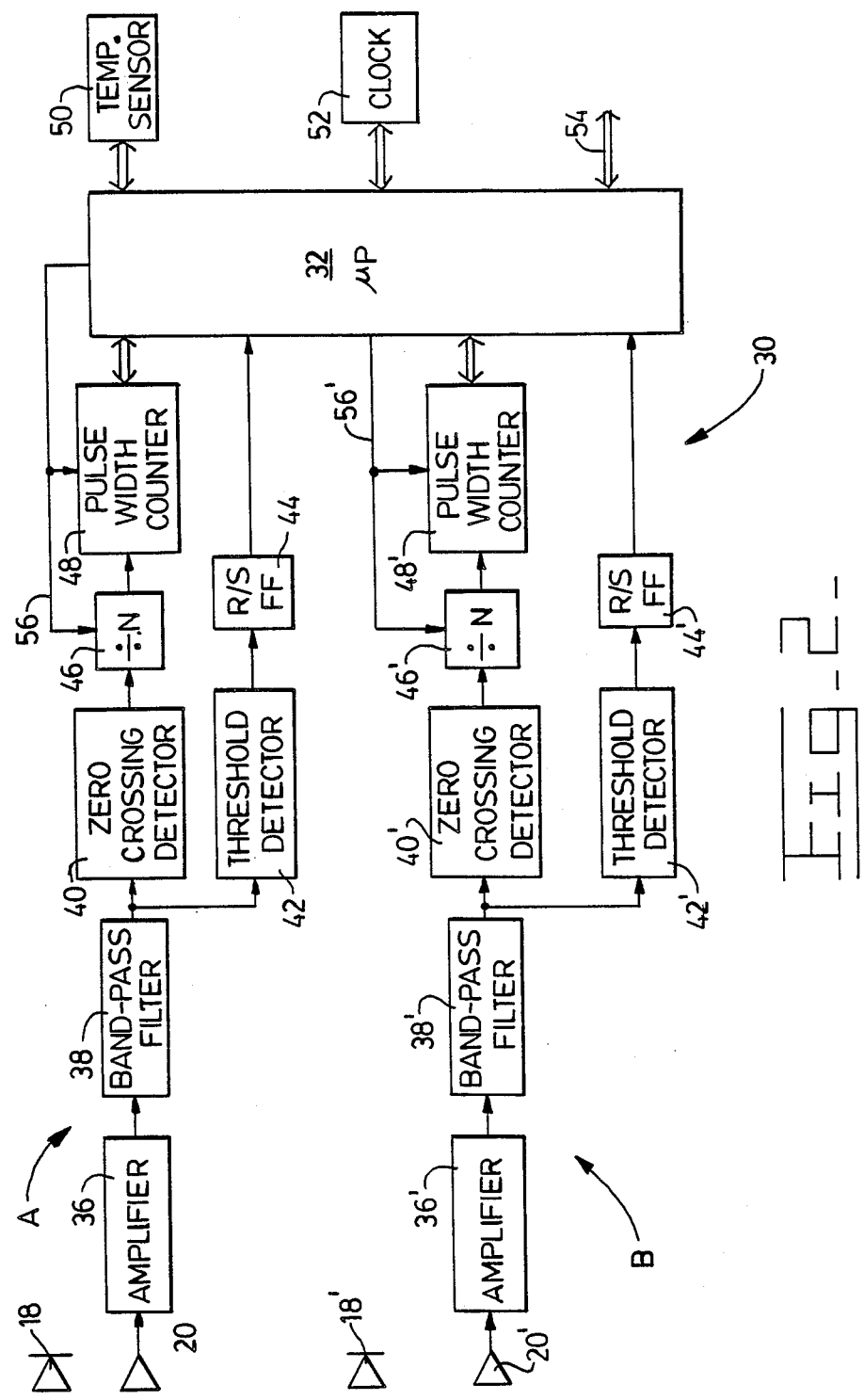
FIG. 2 illustrates a block diagram of a preferred embodiment of the present invention.

As can be seen from the above discussion, the measurement technique used to measure the frequency of the received signals to derive a Doppler shift directly affects the accuracy of the determined velocity. Referring now to FIG. 2, a block diagram of a preferred embodiment of the velocity reference system is shown. The processing means 30 uses digital techniques to detect the Doppler frequencies. Each sensing unit 16,16' is associated with a respective channel A,B. Each channel A,B has a transmitter 18,18' adapted to transmit wave energy at a first and second preselected frequency, respectively, and a receiver 20,20' adapted to receive wave energy reflected from an element or surface 14. A bandpass filter 38,38' filters the received wave energy. It has a predetermined bandwidth to pass signals having a frequency in a range about the preselected frequency of each respective transmitter 18,18'. Having now isolated the reflected signals which correspond to each channel A,B, these analog signals are converted to digital signals, such as a square wave. A dividing means 30 receives the digital signals, and delivers a digital signal having a reduced frequency. This action effectively reduces errors in the microprocessor 32 when it calculates the frequency of an incoming signal, as is explained later. For example, a 40K Hz signal is reduced to a 400 Hz signal. The microprocessor 32, under software control, receives the reduced signal and calculates its frequency. It then multiplies by the reduction factor N, in this case 100, to arrive at the frequency of the received wave. This basically averages 100 cycles of the 40K Hz wave. The microprocessor then compares the received frequency with the transmitted frequency, and delivers a signal responsive to the velocity between the sensing units 16,16' and the reflecting surface 14 in response to the comparison.

More particularly, the first transmitter 18 transmits a first preselected frequency and the second transmitter 18' transmits a second preselected frequency. These frequencies are known to the microprocessor 32. The first and second receivers 20,20' are electrically connected to respective first and second amplifiers 36,36' and first and second bandpass filters 38,38'. The bandpass filters 38,38' are tuned to a preselected bandwidth corresponding to the preselected transmitted frequencies of the transmitters 18,18'. Moreover, the receivers 20,20' also filter incoming signals. In the preferred embodiment the first transmitter 18 emits wave energy at 40K Hz, and the first bandpass filter 42 passes 39.5K Hz to 40.5K Hz. The second transmitter 18' emits wave energy at 50K Hz, and the second bandpass filter 44 passes 49.5K Hz to 50.5K Hz. This configuration virtually eliminates cross talk between the two sensing units 16,16'. Since the transmitted frequencies are 10K Hz apart and the bandpass filters 42,44 have a bandwidth of 1K Hz each about their respective preselected frequency, the signals from one sensing unit are not received by the other sensing unit. The bandwidths and transmitted frequencies vary depending on the environment and desired range of speed measurement. In this application approximately 60 Hz equals 1 mile/hr.

Once the proper frequencies are received, they must be accurately measured. Each channel A,B in the preferred embodiment uses the same type of method and means to detect the frequency of the received wave energy. Therefore, the following description is limited to the first channel A, but it is understood that it is applicable to the second channel B. The first amplifier 36 and the first bandpass filter 38 pass the received wave energy to a first threshold detector 42 and a first zero crossing detector 40. The threshold detector 42 detects the quality of the received wave. The threshold level is set so that background noise will not be mistaken for valid data from the receivers 20,20'. In the preferred embodiment, the threshold detector 42 triggers at 0.6 volts. The zero crossing detector 40 detects the phase of the received wave. In the preferred embodiment, the zero crossing detector 40 has a 0.1 volt deadband. These detectors limit the maximum phase error, at these settings, to $\sin^{-1}(0.1v/0.6v)$, or 9.6 degrees.

If the threshold detector 42 does not trigger, then the amplitude of the incoming wave is less than its trigger point, 0.6 volts. The threshold detector 42 sets a first flip/flop 44, which sends a signal to the microprocessor 32 indicating that a signal "dropout" has occurred. The software uses this signal as described later.

The zero crossing detector 40 converts the sine wave of the received signal to a square wave. Many types of analog-to-digital converters provide this function, and the choice of a zero crossing detector 40 is merely a preferred choice. This type of low amplitude detection is preferred since it eliminates amplitude induced errors, as can be readily appreciated by those skilled in the art. A first divide-by-N counter 46 receives the square wave. This counter 46 accepts N number of pulses of the square wave and then sends a pulse at its output. This effectively lowers the frequency of the received wave energy, and yields a signal having a frequency of 1/N of the received frequency. A first pulse width counter 48 receives the pulses and measures the time between pulses, or state changes, from the divide-by-N counter 46. The period of this signal is easily detected unlike the much higher frequency of the received signal. Since the divide-by-N counter 46 and the pulse width counter 48 sample several periods of the received signal, this method offers much improved accuracy as compared with previous analog techniques, many of which rely on a sampling of only one period. Each time the pulse width counter 48 times a signal, there is a small error. Since this error is spread out over N number of periods, the detected frequency is N times more accurate than it would be if the high frequency received signal were sent directly to the pulse width counter 48. The microprocessor 32 receives the output from the pulse width counter 48 and determines the frequency of the received wave energy. Alternatively, a microprocessor could be used to detect both the time of a pulse width and determine its frequency.

Figure 3:
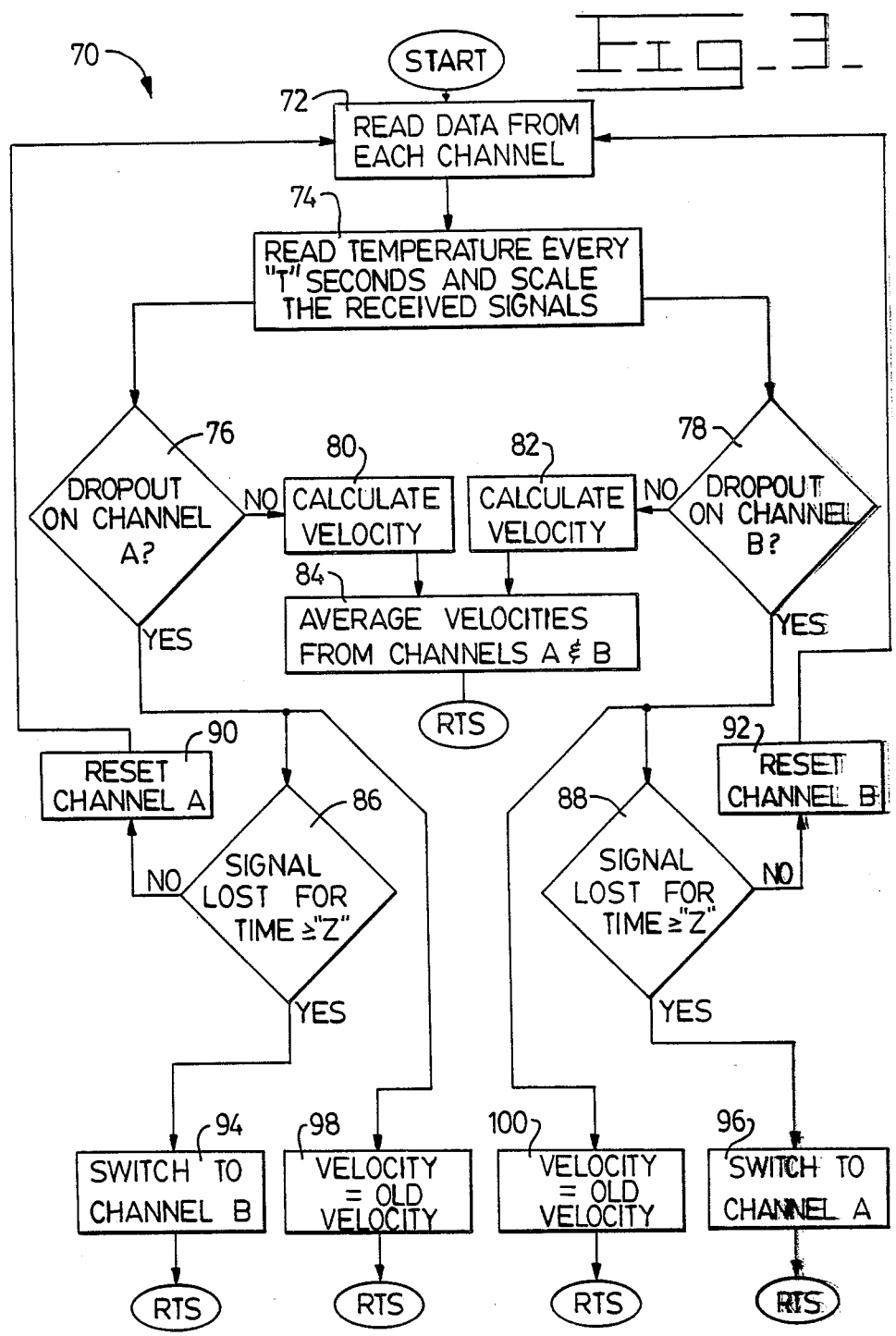
FIG. 3 illustrates a flowchart of a preferred embodiment of the present invention.

Referring now to FIG. 3 wherein a flowchart 70 of a preferred embodiment is shown. Control transfers from the start to a block 72 where data is read from each channel A,B. The software measures the period of the incoming modified signals. Next, control transfers to a block 74 where the input from a temperature sensor 50 is read at every time period "t". The microprocessor scales the modified signals to determine the actual received frequency at the divide-by-N counters 46,46', and also scales the modified signals to account for any changes in the ambient temperature. Control passes to decision blocks 76,78 where the "dropout" signals from the first and second flip/flops 44,44' are read. If the signals do not indicate a dropout, then control passes to blocks 80,82 where the speed of the vehicle is calculated. The frequency of the scaled signal from the block 74 is subtracted from the transmitted frequency to determine the Doppler shift. As stated previously, the Doppler shift correlates to vehicle speed. Then the calculated speeds from the blocks are averaged in block 84. As shown in FIG. 3, an RS232 communications link 54, for instance, sends the velocity information to other control apparatus.

Conversely, if the signals from one of the flip/flops 44,44' indicate a dropout, the previously calculated speed 98 is used for this loop. Also, control passes to the respective decision block 86,88. For ease of understanding, only the flowchart corresponding to channel A will be described. The flowchart corresponding to channel B is substantially equivalent. The decision block 86 determines if the received wave energy signal has been lost for more than a preselected period of time, "Z". In the preferred embodiment, the time period "Z" is set to 50 milliseconds. If the signal has not been lost for more than the preselected time "Z", then control transfers to a block 90 and channel A resets. The microprocessor 32 sends a reset signal via line 56 to the divide-by-N counter 46 and the pulse width counter 48. Upon receipt of the reset signal, a new count starts as channel A attempts to lock on to the received signal. However, if the signal has been lost for more than the preselected time, control transfers to a block 94. This portion of the software disregards information from channel A, and switches to channel B for information. The microprocessor 32 sends a signal indicative of a fault on channel A, so that an operator or service personnel recognize the problem.

Not only is the circuitry and software important, but also the positioning of the sensing units 16,16'. As shown in FIG. 1, the sensing units 16,16' transmit wave energy to the surface 14 and preferably towards substantially the same location. This introduces an inherently high common mode rejection into the system 10. For instance, as the vehicle 12 crests a hill, the sensing units 16,16' only sense the actual vehicle speed, since the waves reflect from a point substantially in the center of the vehicle 12 which does not experience velocity changes due to vehicle pitching and tilting.

Referring now to FIG. 4 wherein a preferred embodiment of the velocity reference system 10 is shown. First and second sensing units 16,16' are positioned in spaced relation along a common axis 26, and connected to a support 24, such as a beam 60. The processing means 30 is substantially the same as described earlier in conjunction with a vehicle application. A conveyor 62 transports articles 64,64',64" in a direction along the common axis 26. The velocity reference system 10 transmits wave energy to the surface 66 of the conveyor 62, and receives reflected wave energy from the surface 66 or from the articles 64,64',64". The processing means 30 detects the Doppler shift of the received wave energy, induced by movement of the conveyor's surface 66. The actual velocity of the surface 66 relative to the sensing units 16,16' is then calculated as previously described.

FIG. 5 illustrates another embodiment of the velocity reference system 10. Similar reference characters are used to denote similar components. A vehicle 12 has a velocity reference system 10 fitted thereon. The velocity reference system functions substantially the same as described previously in association with FIGS. 1 and 4.

The positioning of the sensing units 16,16' in this embodiment offers advantages and disadvantages as compared with the previously discussed embodiments. The first transmitter 18 and the first receiver 20, instead of sharing a common axis 26, are spaced apart on opposite sides of the longitudinal axis. Likewise, the second transmitter 18' and the second receiver 20' are spaced apart on opposite sides of the longitudinal axis, such that one side of the vehicle 12 contains the first transmitter 18 and the second receiver 20', and the other side of the vehicle 12 contains the second transmitter 18' and the first receiver 20. The transmitters 18,18' are directed to transmit wave energy towards substantially the same location on the surface 14. Using this location as a reference, the transmitters 18,18' and the receivers 20,20' are at an angle " of about 20 degrees from the common axis 20. This spacing reduces the receivers' susceptibility to interference from the unassociated transmitter. Conversely, the spacing reduces the system's sensitivity to the Doppler shift. Therefore, the spacing can be adjusted depending on the system's application to achieve the proper balance of sensitivity and noise rejection.

Industrial Applicability

The automotive and heavy equipment industries utilize various electronic control systems on vehicles. The industries tend towards total vehicle automation. Real-time control is essential for an unmanned vehicle. Accurate and responsive controls are needed to inform the vehicle of its current status. The velocity reference system 10 is a quickly responding, accurate device for measuring the velocity of a vehicle, and providing this information to other devices for vehicle control.

The sensing units 16,16' are connected to the underside of a vehicle 12, and positioned generally towards one another. Ideally, each transmitter 18,18' focuses its wave energy at substantially the same location on the ground. This reduces the system's 10 sensitivity to vehicle pitch and ground profile. A temperature sensor 50 is also connected in the vicinity of the sensing units 16,16' for providing an indication of the ambient temperature in which the transmitted wave energy is propagating. The transmitters 18,18' preferably transmit wave energy at different frequencies. The processing means 30 contains bandpass filters 38,38' connected to their respective receivers 20,20', and adapted to pass only frequencies corresponding to their respective transmitters 18,18'. This greatly reduces cross talk from the other transmitters, and also substantially filters out vehicle vibrations. Additionally, each sensing unit 16,16' is connected to circuitry, primarily a divide-by-N counter 46,46' and a pulse width counter 48,48', which greatly reduces errors in detecting the frequency of the received wave energy.

When the vehicle 12 travels over the ground, the transmitters 18,18' emit wave energy at preselected frequencies towards substantially the same location on the ground. Of course, as the ground profile changes, the waves cross each other before striking the ground, or the waves strike the ground a small distance apart. The first transmitter 18 during forward travel has its wave compressed, thus raising its frequency. Similarly, the second transmitter 18' during forward travel has its wave expanded, thus lowering its frequency. As these transmitted waves reflect off of the ground, they further compress or expand, respectively, before they reach the receivers 20,20'. Therefore, the first receiver 20 receives a higher frequency than was transmitted, and the second receiver receives a lower frequency than was transmitted. The Doppler shift is the difference between the transmitted frequency and the received frequency. The processing means 30 amplifies and filters the received signals in order to detect the frequency corresponding to each sensing unit 16,16'. Once the received signals are detected, the processing means 30 effectively digitizes the signals using a zero crossing detector 40, and samples the received signals over several periods. The pulse width counters 48,48' time incoming signals from a leading edge to a next leading edge. The microprocessor 32 subtracts the transmitted frequency from the received frequency to determine the Doppler shift. The Doppler shift correlates to a velocity, which is sent to other real-time controls.

Other aspects, objects, and advantages of this invention can be obtained from a study of the drawings, the disclosure, and the appended claims.

We claim:

1. A velocity reference system for measuring the speed and distance travelled of a vehicle moving in a direction relative to a surface by means of ultrasonic wave Doppler shifts, said vehicle having a longitudinal axis extending in the direction of vehicle travel, said apparatus comprising:

a first sensing unit adapted to transmit and receive sonic wave energy having a first preselected frequency, said first sensing unit being responsive to received sonic wave energy having a first predetermined bandwidth about said first preselected frequency;

a second sensing unit adapted to transmit and receive sonic wave energy having a second preselected frequency, said second sensing unit being responsive to received sonic wave energy having a second predetermined bandwidth substantially non-overlapping said first bandwidth about said second preselected frequency;

said first sensing unit being adapted for mounting on the vehicle along said longitudinal axis and positioned to transmit sonic wave energy generally downwardly toward the surface, aligned along the longitudinal axis, and generally in the direction of vehicle travel, a portion of said transmitted wave energy being reflected by the surface and received by said first sensing unit;

said second sensing unit being adapted for mounting on the vehicle along the longitudinal axis spaced apart from said first sensing unit and positioned to transmit sonic wave energy generally downwardly toward the surface, aligned along the longitudinal axis, generally towards said first sensing unit and in a direction opposed to vehicle travel, a portion of said transmitted wave energy being reflected by the surface and received by said second sensing unit; and digital processing means for determining the speed and distance travelled of said vehicle relative to the surface in response to a Doppler shift of said received sonic wave energy.

2. The velocity reference system, as set forth in claim 1, wherein said transmitted wave energy from each of said first and second sensing units is directed to substantially the same location on said surface.

3. The velocity reference system, as set forth in claim 1, wherein said processing means includes a means for detecting the frequency of said received reflected wave energy.

4. The velocity reference system, as set forth in claim 3, wherein said frequency detecting means includes a zero crossing detector.

5. The velocity reference system, as set forth in claim 3, wherein said frequency detecting means includes an analog to digital converter.

6. The velocity reference system, as set forth in claim 3, wherein said frequency detecting means divides the frequency of the received wave energy by a predetermined magnitude.

7. The velocity reference system, as set forth in claim 3, wherein said processing means compares the detected frequency of said received reflected wave energy with the frequency of said transmitted wave energy, and delivers a signal indicative of relative velocity between said sensing units and said surface in response to said comparison.

8. The velocity reference system, as set forth in claim 7, wherein said processing means includes a temperature sensitive means for adjusting said relative velocity signal in response to the ambient temperature through which said wave energy travels.

9. The velocity reference system, as set forth in claim 1, wherein said processing means includes a means for comparing said received reflected sonic wave energy to a preselected magnitude.

10. The velocity reference system, as set forth in claim 9, wherein said magnitude detecting means delivers a dropout signal in response to said received reflected wave being less than said preselected magnitude.

11. The velocity reference system, as set forth in claim 10, wherein said magnitude detecting means monitors the sensing unit that caused said dropout signal and delivers a disable signal in response to said sensing unit causing said dropout signal for a time exceeding a predetermined time period.

12. A method for sensing the relative velocity between a first body and a second body, comprising;

transmitting sonic wave energy of a first preselected frequency from said first body to a region on said second body;

transmitting sonic wave energy of a second preselected frequency from said first body to substantially the same region on said second body, said second transmission being spaced from said first transmission;

receiving a first and second reflections of the sonic wave energy from said second body;

filtering said first received reflected sonic wave energy and passing a first filtered sonic wave energy signal having a first predetermined frequency range;

filtering said second received reflected sonic wave energy and passing a second filtered sonic wave energy signal having a second predetermined frequency range substantially non-overlapping said first frequency range;

converting said filtered sonic wave energy signals from analog to digital;

comparing said first and second filtered sonic wave energy signal to a predetermined magnitude, and delivering a dropout signal in response to either sonic wave energy signal being less than said predetermined magnitude;

dividing the frequencies of said first and second digital signals by a preselected magnitude;

detecting the frequencies of said first and second divided signals;

calculating the frequency of said reflected wave energy signal as a function of the frequencies of said first and second divided frequency signals and multiply by said preselected magnitude;

comparing said calculated frequency to said preselected frequency to calculate a Doppler shift;

adjusting said calculated frequency in response to a measurement of ambient temperature; and correlating said Doppler shift to a relative velocity between said bodies.

13. A method for sensing the relative velocity between a first body and a second body, as set forth in claim 12, wherein said delivering dropout signal step includes timing a duration of said dropout signal, and switching to the other wave energy transmission not causing said dropout signal when said duration exceeds a predetermined time period.

14. A velocity reference system for measuring the speed and distance travelled of a moving vehicle moving in a direction relative to a surface by means of ultrasonic wave Doppler shifts, said vehicle having a longitudinal axis extending in the direction of vehicle travel and defining a boundary between a first side of said vehicle and a second side of said vehicle, said apparatus comprising:

a first transmitter adapted to transmit wave energy having a first preselected frequency;

a second transmitter adapted to transmit wave energy having a second preselected frequency different from said first preselected frequency;

a first receiver adapted to receive reflected wave energy from said first transmitter, said first receiver being responsive to wave energy having a first predetermined bandwidth about said first preselected frequency;

a second receiver adapted to receive reflected wave energy from said second transmitter, said second receiver being responsive to wave-energy having a second predetermined bandwidth substantially non-overlapping said first bandwidth about said second preselected frequency;

said first transmitter and second receiver being adapted for mounting on the first side of said vehicle, said first transmitter being positioned to transmit wave energy downwardly toward a portion of the surface and generally in the direction of vehicle travel;

said second transmitter and first receiver being adapted for mounting on the second side of said vehicle, said second transmitter being positioned to transmit wave energy generally downwardly toward the same portion of the surface and generally towards said first transmitter and generally in the direction opposed to vehicle travel;

digital processing means for determining the speed and distance travelled of said vehicle relative to the surface in response to a Doppler shift of said received wave energy.

15. The velocity reference system, as set forth in claim 14, wherein said processing means includes a means for comparing said received reflected sonic wave energy to a preselected magnitude.

16. The velocity reference system, as set forth in claim 15, wherein said magnitude detecting means delivers a dropout signal in response to said received reflected wave being less than said preselected magnitude.

17. The velocity reference system, as set forth in claim 16, wherein said magnitude detecting means monitors the sensing unit that caused said dropout signal and delivers a disable signal in response to said sensing unit causing said dropout signal for a time exceeding a predetermined time period.

18. The velocity reference system, as set forth in claim 14, wherein said processing means includes a means for detecting the frequency of said received reflected wave energy.

19. The velocity reference system, as set forth in claim 18, wherein said frequency detecting means includes an analog to digital converter.

20. The velocity reference system, as set forth in claim 18, wherein said processing means compares the detected frequency of said received reflected wave energy with the frequency of said transmitted wave energy, and delivers a signal indicative of relative velocity between said sensing units and said element in response to said comparison.

21. The velocity reference system, as set forth in claim 18, wherein said frequency detecting means divides the frequency of the received wave energy by a predetermined magnitude.

22. The velocity reference system, as set forth in claim 18, wherein said frequency detecting means includes a zero crossing detector.

23. The velocity reference system, as set forth in claim 14, wherein said processing means includes a temperature sensitive means for adjusting said relative velocity signal in response to the ambient temperature through which said wave energy travels.

24. A method for measuring the speed and distance travelled of a vehicle moving in a direction relative to a surface by means of wave energy Doppler shifts, said vehicle having a longitudinal axis extending in the direction of vehicle travel, said method comprising:

transmitting wave energy of a first preselected frequency from said vehicle to a region on said surface in the direction travelled and along said longitudinal axis;

transmitting wave energy of a second preselected frequency different from said first preselected frequency from said vehicle to substantially the same region on said surface along said longitudinal axis in the direction opposed to the direction of travel, said second transmission being spaced apart from said first transmission;

receiving a first and second reflections of the wave energy from said second body;

filtering said first received reflected wave energy and passing a first filtered wave energy signal having a first predetermined frequency range;

filtering said second received reflected wave energy and passing a second filtered sonic wave energy signal having a second predetermined frequency range substantially non-overlapping said first frequency range;

converting said filtered wave energy signals from analog to digital;

comparing said first and second filtered wave energy signal to a predetermined magnitude, delivering a dropout signal in response to either wave energy signal being less than said predetermined magnitude, timing a duration of said dropout signal, and switching to the other wave energy transmission not causing said dropout signal when said duration exceeds a predetermined time period;

dividing the frequencies of said first and second digital signals by a preselected magnitude;
detecting the frequencies of said first and second divided signals;
calculating the frequencies of said reflected wave energy signal as a function of the frequencies of said first and second divided frequency signals and multiply by said preselected magnitude;

comparing said calculated frequency of said preselected frequency to calculate a Doppler shift;
adjusting said calculated frequency in response to a measurement of ambient temperature; and
correlating said Doppler shift to a speed and calculating a travel distance of said vehicle.

* * * * *